(12) United States Patent
Smith et al.

(10) Patent No.: US 8,098,195 B2
(45) Date of Patent: Jan. 17, 2012

(54) PULSE TRANSMITTERS HAVING MULTIPLE OUTPUTS IN PHASE RELATIONSHIP AND METHODS OF OPERATION

(75) Inventors: Mark D. Smith, Glendale, AZ (US); Gregory T. Stayton, Peoria, AZ (US)

(73) Assignee: Aviation Communication&Surveillance Systems LLC, Phoenix, AZ (US)

( * ) Notice: Subject to any disclaimer, the term of this patent is extended or adjusted under 35 U.S.C. 154(b) by 809 days.

(21) Appl. No.: 12/049,803

(22) Filed: Mar. 17, 2008

(65) Prior Publication Data

US 2008/0160932 A1  Jul. 3, 2008

Related U.S. Application Data

(62) Division of application No. 10/942,727, filed on Sep. 15, 2004, now Pat. No. 7,345,626.

(51) Int. Cl.
  *G01S 7/282* (2006.01)
  *G01S 7/00* (2006.01)
  *G01S 13/74* (2006.01)

(52) U.S. Cl. ............... 342/175; 342/29; 342/30; 342/42

(58) Field of Classification Search ............. 342/29–51, 342/175, 195; 375/295, 296, 297, 353; 455/91, 455/114.2, 114.3, 115.1–115.4
See application file for complete search history.

(56) References Cited

U.S. PATENT DOCUMENTS

| | | | |
|---|---|---|---|
| 2,521,733 A * | 9/1950 | Lesti | 375/353 |
| 2,832,827 A * | 4/1958 | Metzger | 375/353 |
| 3,176,225 A * | 3/1965 | Olmstead et al. | 375/353 |
| 3,751,596 A * | 8/1973 | Tseng | 375/353 |
| 4,612,549 A | 9/1986 | Geyer, Jr. et al. | |
| 4,782,450 A | 11/1988 | Flax | |
| 4,901,307 A | 2/1990 | Gilhousen et al. | |
| 5,008,844 A | 4/1991 | Kyriakos et al. | |
| 5,038,146 A | 8/1991 | Troychak et al. | |
| 5,103,233 A | 4/1992 | Gallagher et al. | |
| 5,191,349 A | 3/1993 | Dinsmore et al. | |
| 5,280,285 A | 1/1994 | Curtis et al. | |
| 5,339,086 A | 8/1994 | DeLuca et al. | |
| 5,771,449 A | 6/1998 | Blasing et al. | |
| 5,802,241 A | 9/1998 | Oshima | |
| 5,805,111 A | 9/1998 | Brettner et al. | |
| 5,818,385 A | 10/1998 | Bartholomew | |
| 5,819,000 A | 10/1998 | Oshima | |
| 5,880,693 A | 3/1999 | Drummer | |
| 5,892,879 A | 4/1999 | Oshima | |
| 5,923,293 A | 7/1999 | Smith et al. | |
| 5,999,569 A | 12/1999 | Oshima | |
| 6,005,884 A | 12/1999 | Cook et al. | |

(Continued)

*Primary Examiner* — Bernarr Gregory
(74) *Attorney, Agent, or Firm* — Allen J. Moss; Squire, Sanders & Dempsey L.L.P.

(57) ABSTRACT

A transmitter provides a plurality of output signals. The transmitter includes a processor, a modulator, a first circuit, and a second circuit. The modulator provides a modulated signal responsive to the processor. The modulated signal includes an amplitude modulated radio frequency for transmitting a pulse. The first circuit provides a first output signal, responsive to and with higher power than the modulated signal. The first output signal has a first phase during transmitting of the pulse. The second circuit provides a second output signal, responsive to and with higher power than the modulated signal. The second output signal has a second phase during transmitting of the pulse. The second phase is controlled by the second circuit in accordance with the first phase, the second phase, and indicia of a third phase provided by the processor.

11 Claims, 5 Drawing Sheets

U.S. PATENT DOCUMENTS

| | | |
|---|---|---|
| 6,006,070 A | 12/1999 | Wong |
| 6,009,124 A | 12/1999 | Smith et al. |
| 6,040,801 A | 3/2000 | Dawirs |
| 6,049,651 A | 4/2000 | Oshima |
| 6,052,582 A | 4/2000 | Blasing et al. |
| 6,064,320 A | 5/2000 | d'Hont et al. |
| 6,070,090 A | 5/2000 | Feurstein |
| 6,100,843 A | 8/2000 | Proctor, Jr. et al. |
| 6,112,056 A | 8/2000 | Langston |
| 6,121,914 A | 9/2000 | Cavelos et al. |
| 6,133,868 A | 10/2000 | Butler et al. |
| 6,148,219 A | 11/2000 | Engelbrecht et al. |
| 6,154,451 A | 11/2000 | Zscheile, Jr. et al. |
| 6,157,343 A | 12/2000 | Andersson et al. |
| 6,201,786 B1 | 3/2001 | Zscheile, Jr. et al. |
| 6,222,480 B1 | 4/2001 | Kuntman et al. |
| 6,233,435 B1 | 5/2001 | Wong |
| 6,256,357 B1 | 7/2001 | Oshima |
| 6,268,828 B1 | 7/2001 | Martek |
| 6,271,768 B1 | 8/2001 | Frazier et al. |
| 6,285,313 B1 | 9/2001 | Wahab et al. |
| 6,313,783 B1 | 11/2001 | Kuntman et al. |
| 6,329,947 B2 | 12/2001 | Smith |
| 6,339,399 B1 | 1/2002 | Anderson et al. |
| 6,377,613 B1 | 4/2002 | Kawabe et al. |
| 6,392,598 B1 | 5/2002 | Jones et al. |
| 6,400,317 B2 | 6/2002 | Rouphael et al. |
| 6,400,318 B1 | 6/2002 | Kasami et al. |
| 6,404,386 B1 | 6/2002 | Proctor, Jr. et al. |
| 6,433,729 B1 | 8/2002 | Staggs |
| 6,448,938 B1 | 9/2002 | Chiang et al. |
| 6,449,469 B1 | 9/2002 | Miyahara |
| 6,473,036 B2 | 10/2002 | Proctor, Jr. |
| 6,483,453 B2 | 11/2002 | Oey et al. |
| 6,496,158 B1 | 12/2002 | Ksienski et al. |
| 6,549,716 B1 | 4/2003 | Oshima |
| 6,553,239 B1 | 4/2003 | Langston |
| 6,587,069 B2 * | 7/2003 | Ringwald et al. ............... 342/30 |
| 6,600,456 B2 | 7/2003 | Gothard et al. |
| 6,640,110 B1 | 10/2003 | Shapira et al. |
| 6,646,599 B1 | 11/2003 | Apa et al. |
| 6,683,541 B2 | 1/2004 | Staggs et al. |
| RE38,483 E | 3/2004 | Oshima |
| 6,703,945 B2 | 3/2004 | Kuntman et al. |
| 6,710,742 B1 | 3/2004 | Meredith |
| 6,714,582 B2 | 3/2004 | Nakamura et al. |
| 6,724,976 B2 | 4/2004 | Oshima |
| 6,728,467 B2 | 4/2004 | Oshima |
| RE38,513 E | 5/2004 | Oshima |
| 6,731,920 B1 | 5/2004 | Iwai et al. |
| 6,738,044 B2 | 5/2004 | Holzrichter et al. |
| 6,751,206 B1 | 6/2004 | Padovani et al. |
| 6,753,812 B2 | 6/2004 | Rabinowitz et al. |
| 7,164,722 B2 * | 1/2007 | Takamura .................... 375/353 |
| 7,345,626 B2 * | 3/2008 | Smith et al. .................... 342/175 |
| 2001/0040526 A1 | 11/2001 | Smith |
| 2002/0014986 A1 * | 2/2002 | Ringwald et al. ............... 342/30 |
| 2002/0063653 A1 | 5/2002 | Oey et al. |
| 2002/0075171 A1 | 6/2002 | Kuntman et al. |
| 2002/0089432 A1 | 7/2002 | Staggs et al. |

\* cited by examiner

PULSE TRANSMITTERS HAVING MULTIPLE OUTPUTS IN PHASE RELATIONSHIP AND METHODS OF OPERATION

CROSS-REFERENCE TO RELATED APPLICATIONS

This application is a Divisional application of, and claims priority from, U.S. patent application Ser. No. 10/942,727 by Smith, et al., filed Sep. 15, 2004, now U.S. Pat. No. 7,345,626, the respective disclosure of which is incorporated by reference in its entirety.

FIELD OF THE INVENTION

Embodiments of the present invention relate to transmitters that provide output signals in a suitable phase relationship.

BACKGROUND OF THE INVENTION

Avionic antennas with multiple radiating elements may be used to transmit an omnidirectional pattern or a directional pattern. The accuracy of the pattern may depend upon the accuracy of the phases of the signals driving the antenna. Conventional relatively high power avionic transmitters provide multiple output signals for driving an antenna having a plurality of elements. Such transmitters may include a plurality of similar circuits, each circuit driven from a common source and providing one of the output signals. A typical circuit may include a power amplifier followed by a phase shifter to set a desired output phase and compensate for phase differences introduced by different power amplifiers. The phase shifter necessarily operates at the relatively high power of the output signal. Such phase shifters are expensive and bulky. They consume power and consequently contribute adversely to the thermal characteristics of an enclosed transmitter.

Another conventional avionic antenna has fixed phase shift circuits integral to the antenna assembly to facilitate transmitting one of a set of directional patterns. To use this antenna to transmit omnidirectionally will require an accurate phase relationship among transmitter output signals coupled to the ports of such an antenna.

Without the present invention, further improvements cannot be made in avionic transmitters such as reducing the size, reducing power consumption, and improving phase accuracy of output signals. Improved phase accuracy contributes to improved patterns for directional and omnidirectional uses of an antenna used with the transmitter. Improved patterns are desired for improved communication such as is used for aircraft collision avoidance. Without the present invention, improved aircraft collision avoidance cannot be achieved. Consequently, the risk of loss of life and property cannot be reduced.

SUMMARY OF THE INVENTION

A transmitter, according to various aspects of the present invention, provides a plurality of output signals. The transmitter includes a processor, a signal generator, a first circuit, and a second circuit. The signal generator provides a generated signal having an amplitude modulated radio frequency for transmitting a pulse. The first circuit provides a first output signal, responsive to and with higher power than the generated signal. The first output signal has a first phase during transmitting of the pulse. The second circuit provides a second output signal, responsive to and with higher power than the generated signal. The second output signal has a second phase during transmitting of the pulse. The second phase is controlled by the second circuit in accordance with the first phase, the second phase, and indicia of a third phase provided by the processor.

A method, according to various aspects of the present invention, is performed by a transmitter for transmitting in a Mode S format. The method includes in any practical order: (a) providing an output signal for a first period of time according to a Mode S format; (b) during a second period of time included in the first period of time, detecting a first phase of the output signal; and (c) adjusting a circuit of the transmitter that provided the output signal, adjusting in accordance with the detected first phase to subsequently provide the output signal with a second phase different from the first phase.

A method, according to various aspects of the present invention, is performed by a transmitter for transmitting in a Mode S format. The method includes in any practical order: (a) providing a plurality of output signals for a first period of time according to a Mode S format; (b) during a second period of time included in the first period of time, detecting a respective first phase of each output signal of the plurality; and (c) adjusting a circuit of the transmitter that provided a particular output signal of the plurality, adjusting in accordance with the detected first phase of each of two output signals of the plurality to subsequently provide the particular output signal with a second respective phase different from the first respective phase.

BRIEF DESCRIPTION OF THE DRAWING

Embodiments of the present invention will now be further described with reference to the drawing, wherein like designations denote like elements, and.

DETAILED DESCRIPTION OF THE PREFERRED EMBODIMENTS

Figure 1:
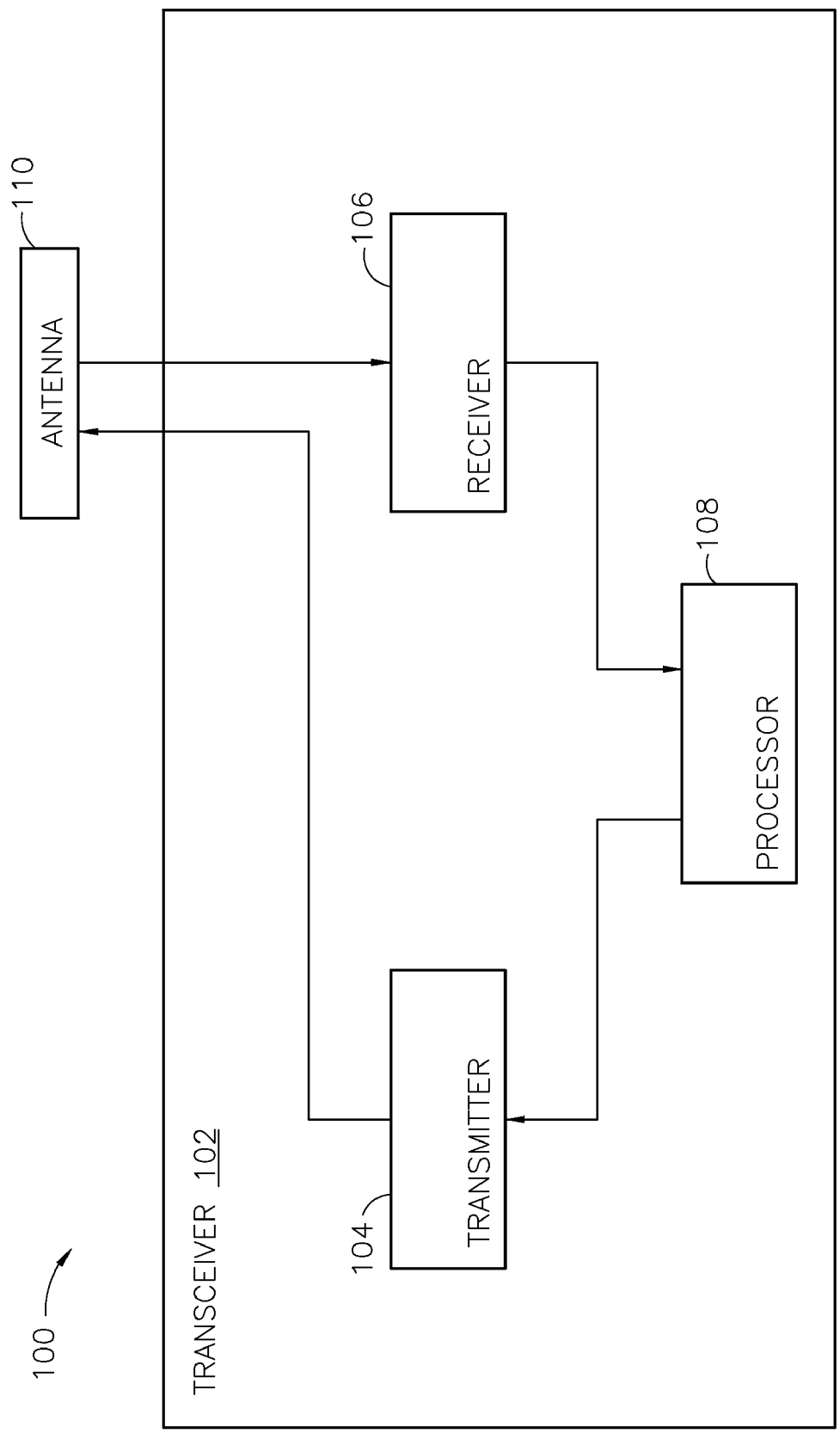
FIG. 1 is a functional block diagram of an avionics system, according to various aspects of the present invention.
Figure 2:
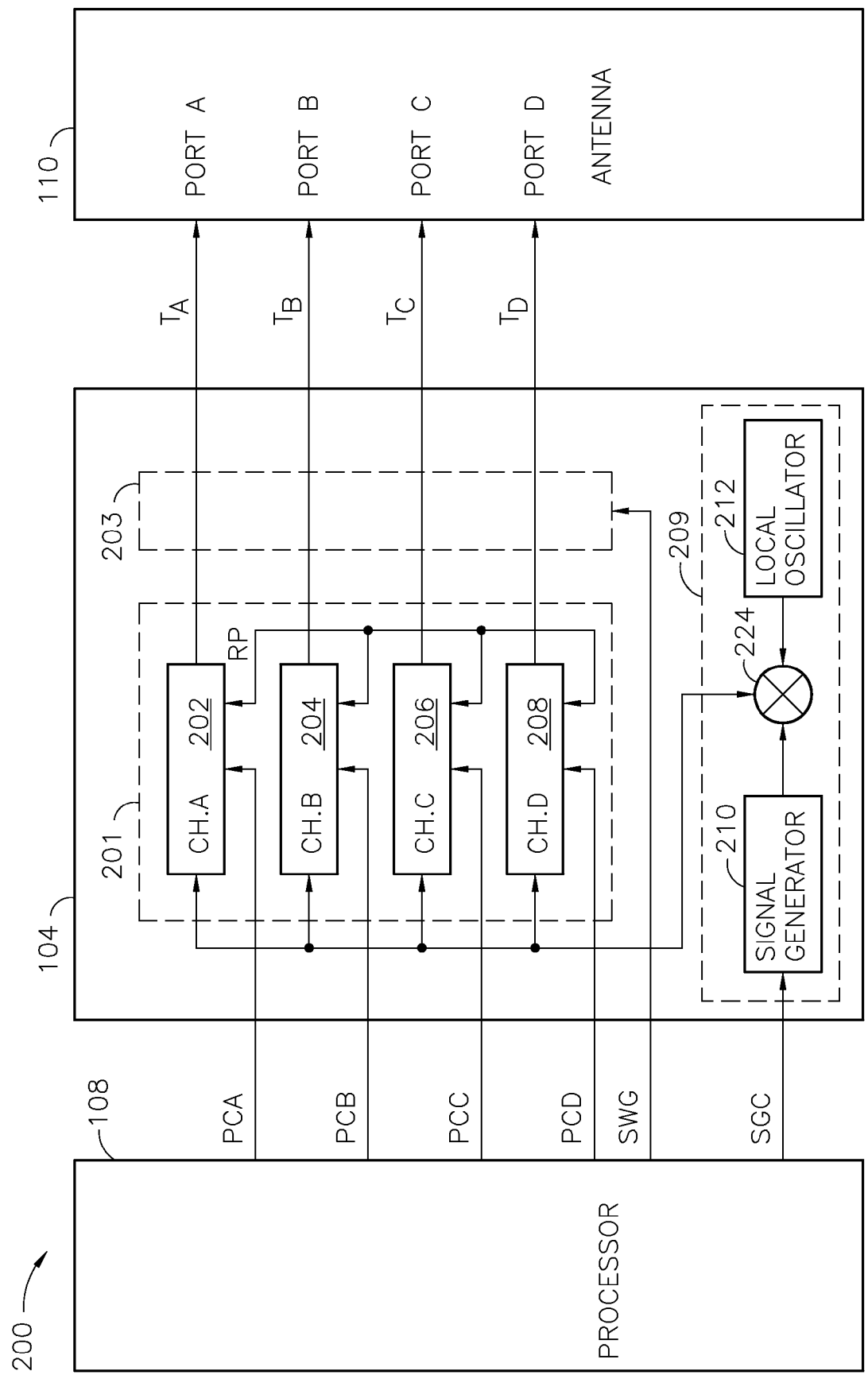
FIG. 2 is a functional block diagram of the transmitter of FIG. 1.
Figure 3:
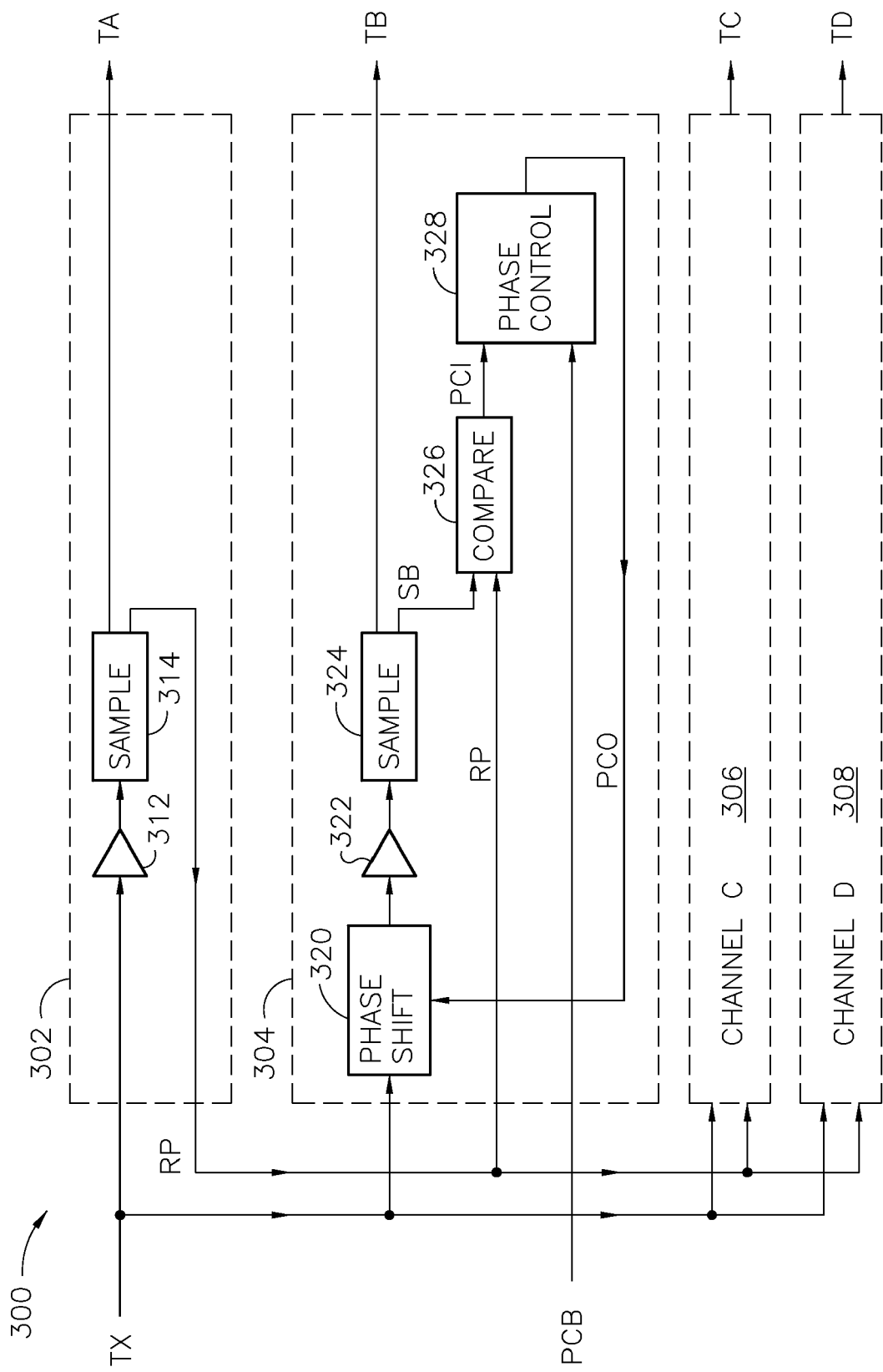
FIG. 3 is a functional block diagram of channel circuits of the transmitter of FIG. 2.

A transmitter may be coupled to an antenna for directional and omnidirectional transmitting for communication, flight safety, and assuring the success of a mission. Communication may include transmitting pulses of radio frequency energy (e.g., a train of individual pulses) where each pulse includes several periods of a radio frequency signal. Communication may include transmitting data in a keyed modulation (e.g., on-off keyed, pulse position modulation, phase shift keyed). Transmitted signals may conform to one or more protocols including protocols used with conventional Air Traffic Control Radar Beacon Systems, conventional transponders (e.g., Identification Friend or Foe, Mode A, Mode C, Mode S, Mode 5), Traffic Alert and Collision Avoidance Systems, the Automatic Dependent Surveillance-Broadcast protocol, and network communication (e.g., airborne data links, station keeping equipment). Such a transmitter may be located on a vehicle (e.g., on land or airborne) or located in a relatively fixed location (e.g., ground-based traffic monitoring and/or control). In any of these applications, a transmitter may provide multiple outputs for driving one or more antennas, antenna elements, or circuits coupling a transmitter to an antenna or antenna element. According to various aspects of the present invention, suitable phase relationships between transmitter output signals may be established and/or maintained while transmitting relatively high energy pulses. Consequently, one or more accurate spatial radiation patterns may be obtained from the antennas or antenna elements used for transmitting the relatively high energy pulses. An accurate spatial radiation pattern contributes to accurate location information of a target (e.g., a responding transponder) at a previously unknown location. Further, accurate spatial radiation patterns contribute to transmitting to a desired location with less energy, resulting in less interference with other systems using radio communication.

A transmitter, according to various aspects of the present invention, may be a stand alone transmitter or integrated with a receiver. For example, system 100 of FIGS. 1-4, includes antenna 110 coupled to transceiver 102. When transmitting, transceiver 102 provides a plurality of signals to antenna 110 in a set of phase relationships between the signals. Any desired phase relationship may be a function of transceiver design, antenna design, installation of system 100 (e.g., distance between transceiver 102 and antenna 110, orientation of antenna 110), and/or operation of system 100 (e.g., a mix of directional and omnidirectional transmitting).

Antenna 110 may include any conventional antenna that is driven by a plurality of transmitter output signals. Antenna 110 may include multiple antennas, each driven by a transmitter output signal; multiple antenna elements, each driven by a transmitter output signal; or multiple antenna circuits, each driven by a transmitter output signal. In a preferred implementation, an antenna is used of the type described in U.S. Pat. No. 5,191,349 by Dinsmore. Such an antenna has four ports, each port receiving a transmitter output signal and comprising a circuit for coupling the transmitter output signal to several elements of the antenna. Such an antenna is conventionally used for directional transmitting and may be used for omnidirectional transmitting. For omnidirectional transmitting, four transmitter output signals are coupled to the four antenna ports. The four transmitter output signals are driven in substantially in phase (e.g., ideally with zero phase difference between any two of the four transmitter output signals).

Transceiver 102 includes transmitter 104, receiver 106, and processor 108. Transmitter 104 and receiver 106 may be coupled to antenna 110 in any conventional manner (e.g., via an antenna switching circuit, not shown). Processor 108 may control transmitter 104 to generate desired transmitter output signals for use in transmitting via antenna 110. Processor 108 may also process signals received via antenna 110 and receiver 106. Processor 108 may include any conventional processor (e.g., a stored program computer) that implements communication as discussed above. In another implementation (e.g., 200 of FIG. 2), receiver 106 is omitted.

A transmitter, according to various aspects of the present invention, provides a plurality of transmitter output signals having a set of phase relationships to an antenna as directed by a processor. For example, in system 200 of FIG. 2, processor 108 provides to transmitter 104 a plurality of phase control signals PCA, PCB, PCC, and PCD. Each phase control signal (e.g., PCB) may be implemented in any conventional manner (e.g., one or more analog signals, one or more digital signals in serial and/or parallel format). Processor 108 also provides to transmitter 104 a signal generator control signal to convey one or more of the information to be transmitted and/or control of the format and/or timing of transmitting. Transmitter 104 provides four transmitter output signals TA, TB, TC, and TD coupled to four ports of antenna 110. Each transmitter output signal (e.g., TA) may be implemented in any conventional manner (e.g., single ended or balanced on one or more conductors). Alternate implementations use any number of channels (e.g., 2, 3, 6, 8) with suitable controls for cooperation with alternate antennas, elements, and antenna circuits.

A particular set of phase relationships among transmitter output signals may be desired at any convenient points between transmitter 104 and antenna 110. At radio frequencies, phase relationships may be affected (e.g., adversely) by differences in circuits (in 104 and/or 110) and by differences in propagation of signals (e.g., length and nature of conductors and paths). For example, in an implementation and installation where considerable distance exists between transmitter 104 and antenna 110, a particular set of phase relations may be measured at the transmitter end of interconnecting cables, at the antenna end of interconnecting cables, at any set of points between transmitter 104 and antenna 110, or a combination of these locations. A desired set of phase relationships may then be determined by analysis and/or tests. Operation of a transmitter, according to various aspects of the present invention, may implement the desired set of relationships.

A transmitter may include a plurality of substantially identical circuits, each circuit for providing one of the transmitter output signals. For example, transmitter 104 includes a modulator 209, a plurality 201 of channel circuits, and may include a matrix switch 203 (shown in straight through form) so that any channel circuit may be used to provide any transmitter output signal. Such a matrix switch may be controlled in any conventional manner, for example, by processor 108. To transmit omnidirectionally via antenna 110, channel circuits 201 may be controlled to transmit equal phase, equal amplitude signals to each port of antenna 110. To transmit directionally via antenna 110, one or more of channel circuits 201 may be controlled to transmit signals of any desired phase and amplitude to one or more ports of antenna 110.

Modulator 209 includes conventional signal generator 210, conventional mixer 224, and conventional local oscillator 212 coupled and, as desired, programmed by processor 108, to provide signal TX to be transmitted. Signal TX may be coupled to each of the channel circuits of plurality 201.

Channel circuits may be of two types. A first type provides a reference signal used by each channel circuit of the second type. For example, plurality 201 includes circuit 202 for channel A of the first type and circuits 204, 206, and 208 for channels B, C, and D of the second type. Channel A provides a reference phase signal RP coupled to each of channels B, C, and D. In another implementation, all channel circuits are identical and capable of operation as the first or second type as directed by processor 108.

Each channel circuit of the second type (e.g., for operation as a circuit of the second type) receives from processor 108 a respective phase control signal as discussed above (PCA, PCB, PCC, and PCD).

System 200 may be operated with an antenna of the type described by Dinsmore as described in Table 1. Ports of the Dinsmore antenna are described herein as physically arranged in clockwise order A-D. Phases are relative to the phase of signal PCA. In Table 1, matrix switch 203 is omitted or is programmed for straight through coupling. In an alternate implementation signal PCA is fixed or omitted (with commensurate simplification of channel circuit 202), phases are relative to signal TA, and various directions are determined by matrix switch 203.

TABLE 1

| PCA | PCB | PCC | PCD | SGC | Antenna Pattern |
|---|---|---|---|---|---|
| 0° | 0° | 0° | 0° | ATCRBS squitter or Mode S reply | omnidirectional |
| 0° | none | none | none | TCAS interrogation or resolution | directional - fore |
| none | 0° | none | none | TCAS interrogation or resolution | directional - starboard |
| none | none | 0° | none | TCAS interrogation or resolution | directional - aft |
| none | none | none | 0° | TCAS interrogation or resolution | directional - port |

A plurality of channel circuits, according to various aspects of the present invention, includes one channel circuit that provides a signal conveying indicia of a reference phase provided to all other channel circuits of the plurality. For example, plurality of channel circuits 300 of FIG. 3 may be used in place of plurality 201 of FIG. 2 omitting signal PCA as discussed above. Circuits 300 include channel circuit 302 (of the first type as discussed above) and identical channel circuits 304-308 (of the second type). Each channel circuit includes a power amplifier 312, 322 and a sample circuit 314, 324. Channel circuits 302-308 further include a compare circuit 326 and a phase control circuit 328.

Amplifier 312 amplifies transmission signal TX in any conventional manner to provide signal TA at a power sufficient to drive antenna 110 PORT A. One or more laterally-diffused metal-oxide-semiconductor (LDMOS) transistors are preferred. Amplifiers 312, 322 are substantially identical in function and structure. Programmable gain and phase control may be integral to amplifiers 312 and/or 322 as controlled by processor 108. Amplifiers 312, 322 may include frequency multiplication capability (e.g., doubler, divider), for example, for economies in design of modulator 209. Each amplifier may have a unique phase shift due to physical differences (e.g., variation in circuit or layout, variation in components and manufacturing, variation in operating temperature, variation in load).

A modulation may be implemented in amplifier 312 (or any stage of amplifier 312). For example, gain control or a switch may be used for on-off keying for pulse position modulation or for phase shift keying. In such an implementation signal TX may be continuous carrier at the radio frequency to be transmitted.

Sample circuit 314 provides an output signal that conveys indicia of the phase of output signal TA in any conventional manner while output signal TA is available at up to full output power. For example, sample circuit 314 provides indicia of a reference phase via signal RP to other channels 304-308. The phase indicated in an output of each sample circuit 314, 324 (RP, SB), may differ somewhat from the phase of the sampled signal (TA, TB) due to physical differences (e.g., variation in circuit or layout, variation in components and manufacturing, variation in operating temperature, variation in load). As discussed below, phase compensation is provided by a plurality of channels cooperating according to various aspects of the present invention so as to reduce the effect of undesired phase differences among transmitter output signals. Because circuits as discussed herein may provide a relatively wide range of phase compensation at full power of transmitter output signals, design variation among channel circuits may be tolerated permitting more economical circuit layout and manufacturing (and improved reliability).

A compare circuit compares indicia of phase from several sources and provides a signal having indicia of a phase difference. For example, compare circuit 326 receives signal RP from sample circuit 314 and signal SB from sample circuit 324. Compare circuit 326 provides a signal PCI that conveys indicia of an algebraic difference in phase between the phases indicated by signals RP and SB. A channel circuit may conform to principles of conventional feedback control circuit design having an error signal corresponding to or included in signal PCI. In a preferred implementation the output signal of a sample circuit includes a radio frequency having a phase indicative of the phase of the sampled signal. Compare circuit 326 may include a conventional mixer that provides a direct current signal having a magnitude proportional to the algebraic difference in phase between RP and SB. In another implementation, sample circuits and compare circuits may be implemented with digital techniques (e.g., amplitude normalization and amplitude sampling) and/or include digital to analog conversion (e.g., producing signal PCI in a serial or parallel digital format).

A phase control circuit provides a control signal to adjust the phase of a transmitter output signal. The control signal may be coupled to a phase shift circuit and/or an amplifier as discussed above. For example, phase control circuit 328 receives a signal having phase control information (PCI) from compare circuit 326 and a signal having a set point phase value (PCB) from processor 108. Circuit 328 provides a phase control output signal PCO to phase shift circuit 320. Signal PCO is preferably in a digital form for selectively operating cumulative discrete phase control elements of phase shift circuit 320.

Phase control circuit 328 may respond to signal PCI with an update in the adjustment value of signal PCO in a continuous (e.g., analog), periodic, conditional (e.g., when a change in PCI or PCB exceeds a limit amount), or ad hoc manner (e.g., at times prescribed by processor 108). The adjustment value may be in accordance with signal PCI currently or at one or more suitable times in the past. Criteria for updating the adjustment value of signal PCO may be determined by phase control circuit 328 and/or by processor 108. For example, phase control signal PCB may indicate an instant in time (or a period) when signal PCI is valid due to characteristics of the transmission signal.

Operation of the feedback loop consisting of phase shift circuit 320, amplifier 322, sample circuit 324, compare circuit 326, and phase control circuit 328 may be closed-loop (e.g., continuous with substantially no delay between changes in PCI and PCO), closed for a period of time and then opened (a final adjustment per signal PCO being maintained by phase shift circuit 320), or discontinuous (signal PCI sampled or averaged over several samples then signal PCO updated at any suitable time after sampling or averaging).

Signal PCI may be subject to preliminary filtering so that a filtered result provides a basis for a next adjustment value of signal PCO. Signal PCO may be subject to filtering so that changes in adjustment value are limited to a maximum step size per adjustment over a step duration. Consequently, undesired bounce, jitter, and hunting may be reduced in the feedback loop. By reducing bounce, jitter, and/or hunting, undesired phase and frequency noise may be reduced in the transmitter output signal (TB) and stresses (e.g., local heating) may be reduced in circuits and components of the loop. When transmitting is not continuous, changes to signal PCO may be made when not transmitting.

Figure 4:
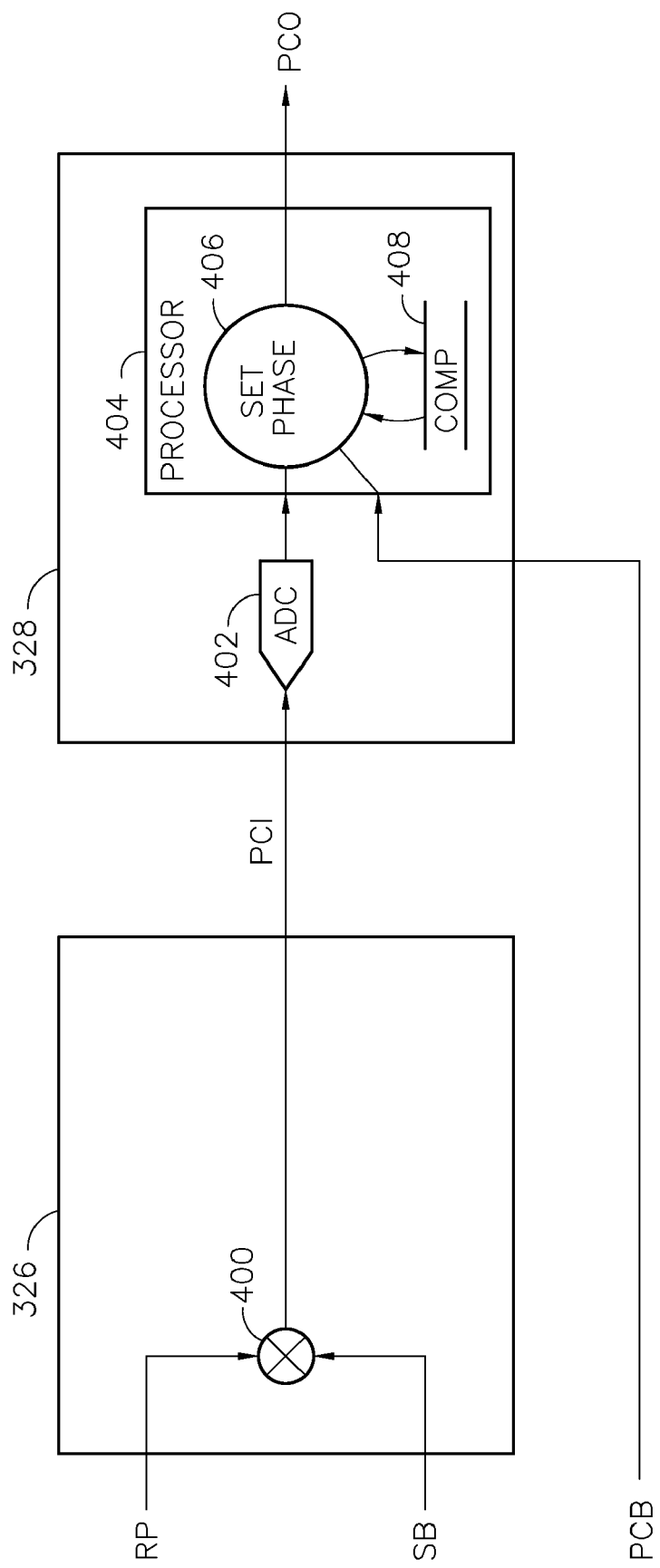
FIG. 4 is a functional block diagram of a portion of a channel circuit of FIG. 3.

A phase control circuit may include a processor that performs a method for assuring transmitter output signals conform to a desired set of phase relationships. Each channel circuit may include such a processor. In another implementation, one processor receives respective inputs from each channel circuit, provides respective outputs to each channel circuit, and performs the method in any conventional manner for all channel circuits (e.g., sequentially, multitasking, multithreading). For example, in the implementation shown in FIG. 4, compare circuit 326 includes a mixer 400 responsive to signals RP and SB as discussed above. Mixer 400 provides signal PCI to phase control circuit 328. Phase control circuit 328 includes ADC 402 and processor 404. Phase control circuit 328 employs conventional circuits and firmware for the purposes discussed herein. Signal PCI is subject to analog to digital conversion by ADC 402 and results are subject to processing by processor 404. Processor 404 in addition to ADC output, receives signal PCB and provides signal PCO.

In another implementation, processor 108 receives phase information signals (e.g., PCI in analog form or after conversion to digital form) from each channel circuit and provides phase control signals (e.g., PCO) to each phase shift circuit. Signals PCA, PCB, PCC, and PCD may be omitted; and, the phase control circuit (e.g., 328) may be omitted from each channel circuit.

As discussed above, a set phase process and compensation store may be implemented in each phase control circuit 328 (processor 404), in a processor common to all channel circuits (not shown), or in processor 108. For clarity of description, set phase process 406 and compensation store 408 will be described with reference to FIG. 4 as implemented in each phase control circuit 328, typical for a plurality of channel circuits (201 or 300).

Set phase process 406 reads from time to time indicia of a phase difference provided by ADC 402, reads from time to time indicia of a phase set point from signal PCB, reads and writes compensation values to compensation store 408, and provides adjustment values from time to time via signal PCO to implement any channel circuit functions discussed above. Set phase process 406 may perform at any suitable time (e.g., as directed by signal PCB) configuration control, phase control for omnidirectional transmitting, and phase control for directional transmitting.

Processor 108 may prescribe operating values for set phase process 406. Set phase process 406 may implement configuration control by reading such operating values and/or software from processor 108 as conveyed in any conventional manner by signal PCB. Operating values may include any suitable limit value, duration, repetition rate, period or software for channel circuit functions described above.

Phase control for omnidirectional transmitting may include setting an adjustment value of signal PCO based on signal PCI, ignoring any reference to a phase set point (if not zero) of signal PCB, and storing a compensation value in compensation store 408. As an example, consider the phase difference from signal TX to signal TA to be 5°. Consider the phase difference between TX and TB to be 2° with signal PCO directing phase shift circuit 320 to provide zero additional phase shift. Signal PCI reports a phase difference of 3° (5 minus 2). Set phase process 406 stores the value 3° in compensation store 408 and provides an adjustment value of 3° via signal PCO. Phase shift circuit 320 adds 3° to the delay TX to TB so that signal TA and TB are both 5° from signal TX. Consequently, a phase difference between TA and TB is zero (e.g., as desired per Table 1 row 1). Signal PCI also reports zero phase difference. Set phase process 328 may provide adjustment values in any conventional sequence (e.g., optimization) until a minimum phase difference is reported by signal PCI.

Phase control may include recalling a compensation value from compensation store 408, adding the recalled compensation value to a set point value read from signal PCB, and providing an adjustment value of signal PCO based on the sum. For example, if signal PCB prescribes a set point of 90°, set phase process 406 may recall a compensation value of 3° from store 408, form a sum of 93° (90 plus 3), and provide an adjustment value of 93° via signal PCO. Consequently, by operation of phase shift circuit 320, the phase difference between transmitter output signals TB (at 95° from TX) and TA (at 5° from TX) is 90° (95 minus 5), compensated for differing channel circuit delays.

The techniques described above facilitate transmitting in a plurality of modes with one or more antennas. For example, several modes are discussed above for directional transmitting and omnidirectional transmitting from a system 100 that includes one antenna 110 and may include a switch 203. A system 100 that uses multiple antennas may use these techniques to implement configuration changes among antennas and desired transmitting modes. Processor 108 may provide signals PCA-PCD with respective set point phases suitable for each antenna and transmitting mode. Processor 108 may include information on each phase control signal (PCA-PCD) that identifies an antenna and antenna port (or element) for suitable operation of phase control circuit 328. For instance compensation values stored in compensation store 408 may be indexed by antenna and antenna port (or element). Each phase control circuit may receive control signal SWC to determine or assist in determining what antenna and antenna port (or element) it will be coupled to.

Figure 5:
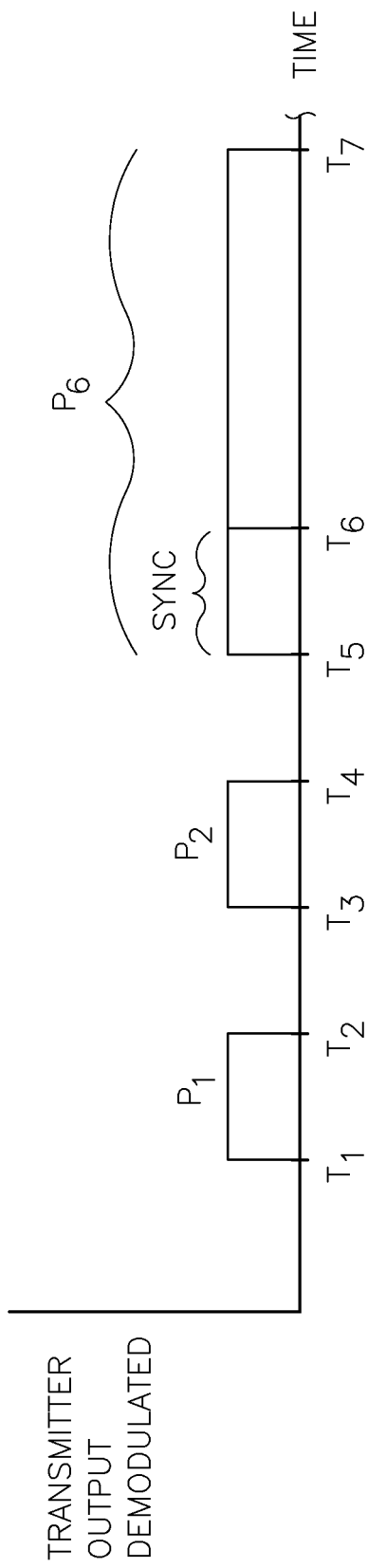
FIG. 5 is a timing diagram of a signal transmitted by the transmitter of FIG. 1.

Referring to FIG. 5, a waveform is shown that may be transmitted by avionics system 100. In this instance, the waveform may represent a TCAS transmission (e.g., an omnidirectional interrogation in a MODE S format) providing a pulse PI from time $t_1$ to time $t_2$, a pulse P2 from time $t_3$ to time $t_4$ and a pulse P6 from time $t_5$ to time $t_7$, including in pulse P6 a synchronization period from time $t_5$ to time $t_6$. As discussed above, operation of sample circuit 314, sample circuit 324, compare circuit 326, phase control circuit 328, and phase shift circuit 320 may be simultaneous for closed loop control or may be individually operated during a sequence of times. In a preferred mode of operation, sample circuits 314 and 324 are operated simultaneously during a transmission of suitable duration to allow a reliable measurement of phase (signals RP and SB) or phase difference (signal PCI). For example, the duration of pulse P1, P2 or the sync portion of pulse P6 may be of sufficient duration. The sync portion of pulse P6 is preferred when propagation delays through circuits 326 and 328 are sufficiently low to permit adjusting phase prior to sending data in the remainder of pulse P6 (e.g., from times $t_6$ to $t_7$).

Figure 6:
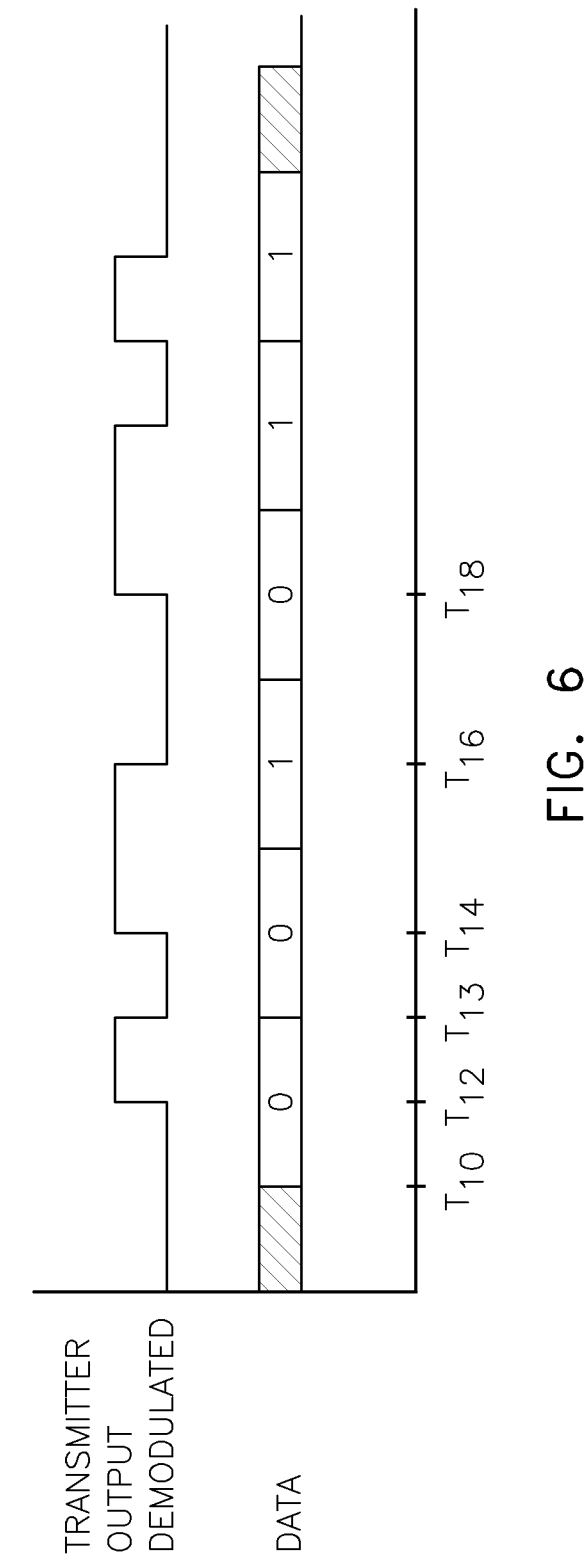
FIG. 6 is a timing diagram of another signal transmitted by the transmitter of FIG. 1.

Referring to FIG. 6, another waveform is shown that may be transmitted by avionics system 100. In this instance, the waveform 602 may represent part of a transmission from a transponder (e.g., an omnidirectional reply in a MODE S format). Waveform 602 conveys data in a binary pulse position modulation. When a "0" bit is followed by a "1" bit, a pulse (e.g., from times $t_{14}$ to $t_{16}$) is transmitted of sufficient duration to operate sampling circuits 314 and 324. An adjustment to phase may be implemented by circuits 326, 328, and 320 at any time while not transmitting e.g., from times $t_{16}$ to $t_{18}$, and/or while transmitting. Other implementation may include sampling circuits that respond more quickly for operation in shorter pulse durations (e.g., from times $t_{12}$ to $t_{13}$).

The foregoing description discusses preferred embodiments of the present invention which may be changed or modified without departing from the scope of the present invention as defined in the claims. While for the sake of clarity of description, several specific embodiments of the invention have been described, the scope of the invention is intended to be measured by the claims as set forth below.

What is claimed is:

1. A system, comprising:
an air traffic collision avoidance system having a transmitter that provides a plurality of output signals, wherein the transmitter comprises:
a processor;
a signal generator that provides a generated signal comprising an amplitude modulated radio frequency for transmitting a pulse;
a first circuit that provides a first output signal, responsive to and with higher power than the generated signal, the first output signal having a first phase during transmitting of the pulse; and
a second circuit that provides a second output signal, responsive to and with higher power than the generated signal, the second output signal having a second phase during transmitting of the pulse, the second phase controlled by the second circuit in accordance with the first phase, the second phase, and indicia of a third phase provided by the processor.

2. The transmitter of claim 1 wherein the second circuit operates to reduce a first absolute difference between the second phase and the first phase.

3. The system of claim 2 wherein the second circuit further operates to reduce a second absolute difference between the first absolute difference and the third phase.

4. The system of claim 3 wherein the second circuit comprises a second processor having a memory that includes a compensation value applied by the processor to reduce the second absolute difference.

5. The system of claim 1 wherein:
the first circuit comprises a first sampling circuit that provides indicia of the first phase; and
the second circuit comprises:
(1) an amplifier that provides the second output signal;
(2) a second sampling circuit that provides indicia of the second phase;
(3) a phase detector that provides an error signal in accordance with the indicia of the first phase and the indicia of the second phase;
(4) a phase controller that provides a phase control signal in accordance with the error signal and the indicia of the third phase; and
(5) a phase shifter that couples the generated signal to the amplifier and introduces an adjustment phase shift in the generated signal in accordance with the phase control signal.

6. The system of claim 1 wherein:
the generated signal further comprises a first portion for synchronization of a provided receiver and a second portion for conveying data in accordance with a phase modulation; and
the first portion comprises the pulse.

7. The system of claim 6 wherein:
the first circuit comprises a first sampling circuit that provides indicia of the first phase; and
the second circuit comprises:
(1) an amplifier that provides the second output signal;
(2) a second sampling circuit that provides indicia of the second phase;
(3) a phase detector that provides an error signal in accordance with the indicia of the first phase and the indicia of the second phase;
(4) a phase controller that provides a phase control signal in accordance with the error signal and the indicia of the third phase; and
(5) a phase shifter that couples the generated signal to the amplifier and introduces an adjustment phase shift in the generated signal in accordance with the phase control signal, the adjustment phase shift not subject to change during transmitting.

8. The system of claim 7 wherein the phase shifter comprises a second processor having a memory that includes a compensation value applied by the processor to reduce the second absolute difference.

9. The system of claim 1 wherein:
the first circuit and the second circuit each comprise a respective power amplifier; and
each output signal of the plurality has a power of greater than 200 watts.

10. The system of claim 1 wherein the pulse is part of a Mode S reply.

11. The system of claim 1 wherein the pulse is part of a Mode S interrogation.

* * * * *